US011565569B2

(12) United States Patent
Masuda et al.

(10) Patent No.: US 11,565,569 B2
(45) Date of Patent: Jan. 31, 2023

(54) HEATER APPARATUS

(71) Applicant: SUBARU CORPORATION, Tokyo (JP)

(72) Inventors: Yo Masuda, Tokyo (JP); Ryoma Okazumi, Tokyo (JP); Isao Nakagawa, Tokyo (JP); Takahiro Akaba, Tokyo (JP); Takuya Takashima, Tokyo (JP); Ringo Shimada, Tokyo (JP); Shogo Yoshida, Tokyo (JP); Hiroto Asai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 972 days.

(21) Appl. No.: 16/375,475

(22) Filed: Apr. 4, 2019

(65) Prior Publication Data

US 2019/0315187 A1    Oct. 17, 2019

(30) Foreign Application Priority Data

Apr. 16, 2018 (JP) .............................. JP2018-078603

(51) Int. Cl.
*B60H 1/00* (2006.01)
*B60H 1/14* (2006.01)
(Continued)

(52) U.S. Cl.
CPC ..... *B60H 1/00392* (2013.01); *B60H 1/00278* (2013.01); *B60H 1/143* (2013.01); *H01M 10/625* (2015.04); *B60H 2001/2246* (2013.01)

(58) Field of Classification Search
None
See application file for complete search history.

(56) References Cited

U.S. PATENT DOCUMENTS 4,847,468 A * 7/1989 Hufstetler .......... B60H 1/00264
165/41
5,111,025 A * 5/1992 Barma .................... A47C 7/748
219/217

(Continued)

FOREIGN PATENT DOCUMENTS

JP    S50-037539 Y1    10/1975
JP    2002-250869 A    9/2002
(Continued)

OTHER PUBLICATIONS

Japanese Office Action, dated Apr. 7, 2020, in Japanese Application No. 2018-078603 and English Translation thereof.

*Primary Examiner* — Mohammad J Rahman
(74) *Attorney, Agent, or Firm* — McGinn I.P. Law Group, PLLC.

(57) ABSTRACT

A heater apparatus includes a base member, a cover member supported by the base member, a cloth member provided between the base member and the cover member to hold a heater wire, and a heater temperature sensor brought into contact with the cloth member, covered on a base member side facing the base member and a cover member side facing the cover member with the cloth member, and configured to detect a temperature of the heater wire. The cover member has a cover recessed portion recessed towards the base member in an overlapping region where the cloth member on the base member side and the cloth member on the cover member side of the heater temperature sensor overlap.

18 Claims, 6 Drawing Sheets

(51) Int. Cl.
*H01M 10/625* (2014.01)
*B60H 1/22* (2006.01)

(56) References Cited

U.S. PATENT DOCUMENTS

| | | | | |
|---|---|---|---|---|
| 6,492,059 B1 * | 12/2002 | Hottori | ............... | H01M 50/491 |
| | | | | 429/251 |
| 2008/0198897 A1 | 8/2008 | Suzuki et al. | | |
| 2009/0200987 A1 * | 8/2009 | Saito | .................... | H02J 7/0014 |
| | | | | 320/134 |
| 2010/0025388 A1 * | 2/2010 | Ono | ....................... | A47C 7/748 |
| | | | | 219/217 |
| 2016/0285139 A1 * | 9/2016 | Kimura | ................ | H01M 50/20 |
| 2017/0256833 A1 * | 9/2017 | Ciaccio | ............ | H01M 10/0481 |
| 2017/0266035 A1 * | 9/2017 | Kuo | .................. | A41D 13/0051 |
| 2018/0118064 A1 * | 5/2018 | Sato | ....................... | A47C 7/748 |
| 2018/0323483 A1 * | 11/2018 | Hsu | .................. | H01M 10/6571 |
| 2019/0015295 A1 * | 1/2019 | Marton | ............... | A61H 23/0263 |
| 2019/0125579 A1 * | 5/2019 | Habib | .................... | A61F 7/007 |
| 2019/0257598 A1 * | 8/2019 | Smalc | ....................... | B32B 5/26 |
| 2020/0025424 A1 * | 1/2020 | Cauchy | ............... | B60N 2/5635 |

FOREIGN PATENT DOCUMENTS

| | | | |
|---|---|---|---|
| JP | 2002-270343 A | | 9/2002 |
| JP | 2003-023119 A | | 1/2003 |
| JP | 2008-204708 A | | 9/2008 |
| JP | 2014-011061 A | | 1/2014 |

* cited by examiner

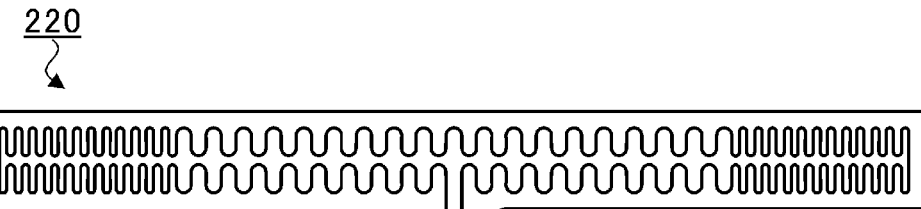
FIG. 4A
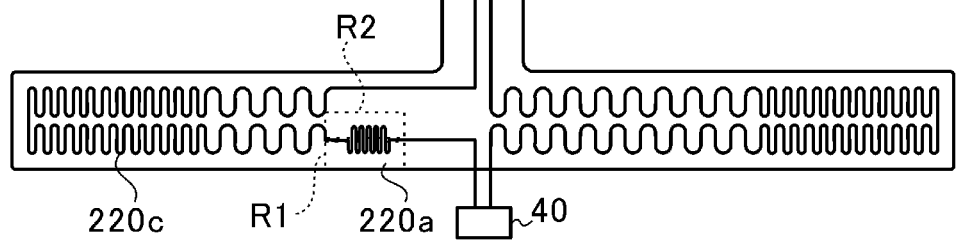
FIG. 4B
FIG. 4C
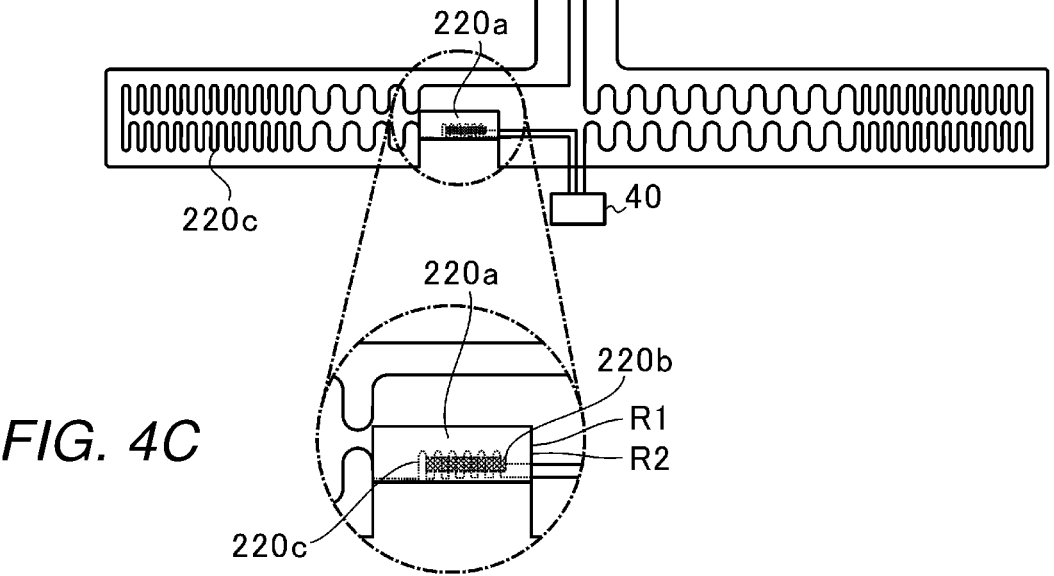

HEATER APPARATUS

CROSS-REFERENCE TO RELATED APPLICATIONS

The present application claims priority from Japanese Patent Application No. 2018-078603 filed on Apr. 16, 2018, the entire contents of which are hereby incorporated by reference.

BACKGROUND

1. Technical Field

The disclosure relates to a heater apparatus of a vehicle.

2. Related Art

Japanese Unexamined Patent Application Publication (JP-A) No. 2014-011061 discloses a technique in which a planar heater is mounted on a secondary battery mounted on an electric vehicle and the planar heater is heated to heat the secondary battery.

JP-A No. 2002-270343 discloses an onboard seat heater comprising a heater wire fixed to a base material such as a nonwoven fabric by sewing and a temperature control member configured to control the temperature of the heater wire.

SUMMARY

An aspect of the disclosure provides a heater apparatus including: a base member; a cover member supported by the base member; a cloth member provided between the base member and the cover member to hold a heater wire; and a heater temperature sensor brought into contact with the cloth member, covered on a base member side facing the base member and a cover member side facing the cover member with the cloth member, and configured to detect a temperature of the heater wire, in which the cover member has a cover recessed portion recessed towards the base member in an overlapping region where the cloth member on the base member side and the cloth member on the cover member side of the heater temperature sensor overlap.

BRIEF DESCRIPTION OF THE DRAWINGS

FIGS. 4A-4C are schematic plan views explaining a configuration of a nonwoven fabric.

DETAILED DESCRIPTION

Figure 1:
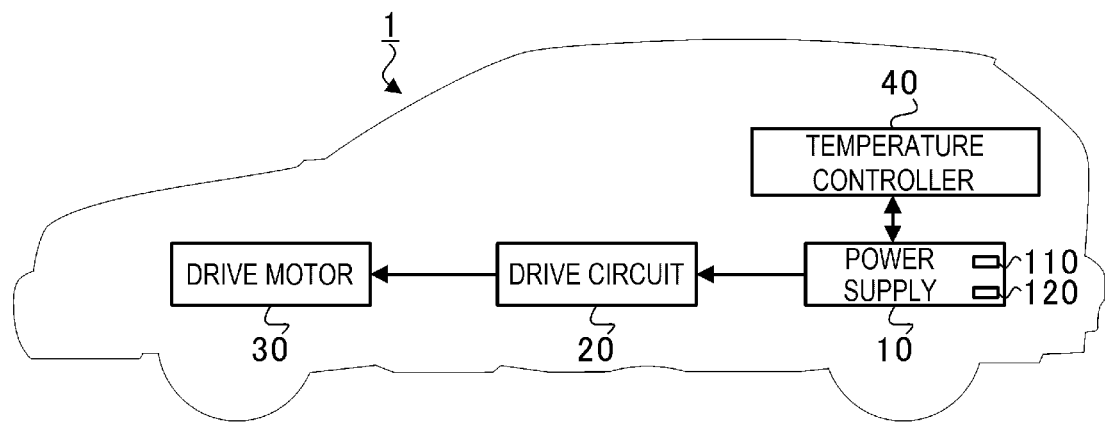
FIG. 1 is a functional block diagram illustrating a configuration of a vehicle.

In the following, some preferred but non-limiting embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

The configuration of the onboard seat heater of JP-A No. 2002-270343 can be applied, as a specific configuration, to the planar heater configured to heat the secondary battery mounted on the electric vehicle of JP-A No. 2014-011061. In the onboard seat heater of JP-A No. 2002-270343, however, when the heater wire and the temperature control member are fixed together with a double-stick tape, the heater wire and the temperature control member may separate from each other as a result of the double-stick tape peeling off due to aged deterioration. In the event that the heater wire and the temperature control member separate from each other, there may be fears that the accuracy with which the temperature of the heater wire is detected cannot be maintained.

Then, it is desirable to provide a heater apparatus capable of maintaining the accuracy with which the temperature of a heater wire is detected.

(Vehicle 1)

FIG. 1 is a functional block diagram illustrating a configuration of a vehicle 1 according to an embodiment of the disclosure. The vehicle 1 includes a power supply 10, a drive circuit 20, a drive motor 30, and a temperature controller 40. Here, an electric vehicle (EV) will be described as the vehicle 1.

The power supply 10 includes a battery 110 and a heater apparatus 120. The battery 110 is made up of a secondary battery such as a lithium ion battery made up of a plurality of cells and accumulates direct current (DC) power having a voltage of 100 V or more. In one implementation, the battery 110 may function as a "driving high-voltage battery". The heater apparatus 120 raises the temperature of the battery 110.

The drive circuit 20 is made up of an inverter or the like, converts DC power supplied from the battery 110 into three-phase alternating current (AC) power, and supplies the three-phase AC power to the drive motor 30. The drive motor 30 is made up of, for example, a synchronous motor, and receives a supply of three-phase AC power from the drive circuit 20 to function as a drive source of the vehicle 1.

The temperature controller 40 controls the temperature of the battery 110 by controlling the heater apparatus 120. Hereinafter, the configuration of the power supply 10 will be described.

Figure 2:
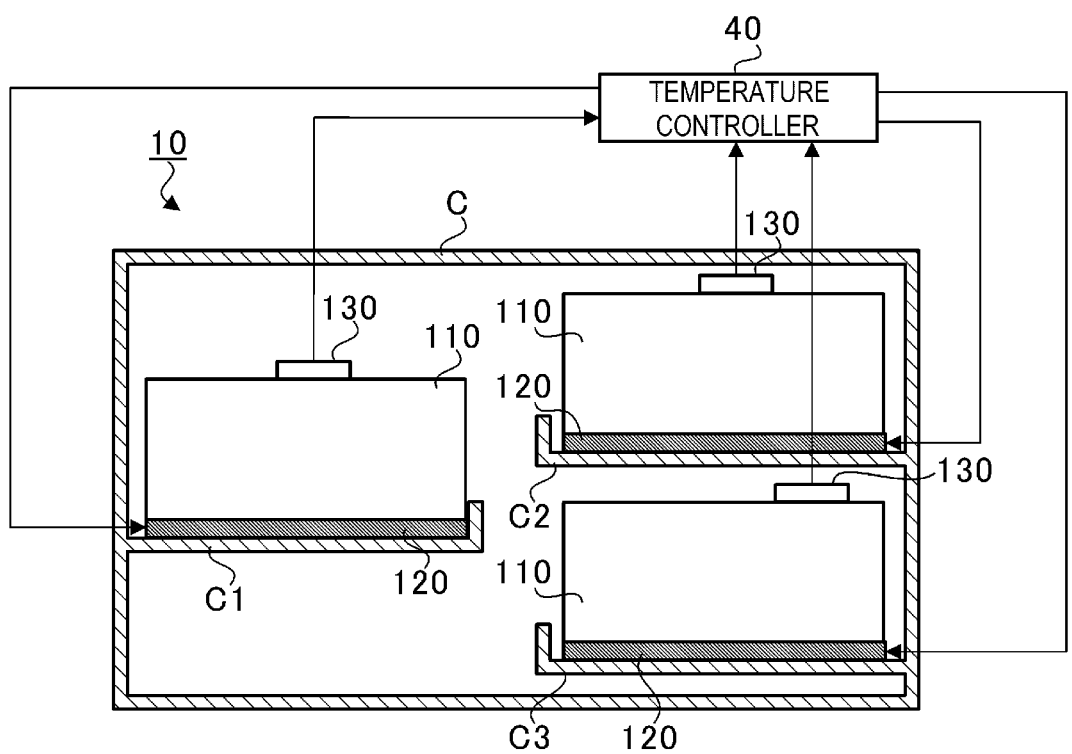
FIG. 2 is a vertical cross-sectional view explaining a schematic configuration of a power supply.

FIG. 2 is a vertical cross-sectional view explaining a schematic configuration of the power supply 10. In FIG. 2, an upper side denotes an upward direction of the vehicle 1 and the power supply 10, and a lower side denotes a downward direction of the vehicle 1 and the power supply 10. The power supply 10 has a case C and houses a plurality of batteries 110 like the battery 110 and a plurality of heater apparatuses 120 like the heater apparatus 120 in an interior the case C. In the example illustrated in FIG. 2, the power supply 10 accommodates three batteries 110 and three heater apparatuses 120 in the interior of the case C. One heater apparatus 120 is attached to a lower portion of one battery 110, and the battery 110 and the heater apparatus 120 make up a pair.

The case C includes a plurality of holding members C 1, C 2, and C 3. In the example illustrated in FIG. 2, the case C includes three holding members C 1, C 2, and C 3. Each holding member holds one battery 110 and one heater apparatus 120 as a pair. A battery temperature sensor 130 is attached to each battery 110 and detects a temperature of the battery 110.

The temperature controller 40 is made up of a semiconductor integrated circuit including a central processing unit (CPU), a ROM incorporating a program or the like, a RAM as a work area, or the like. The temperature controller 40 acquires detection signals of the battery temperature sensors 130, and controls the heater apparatuses 120 based on the acquired detection signals.

The temperature controller 40 can control the temperatures of the batteries 110 by controlling the corresponding heater apparatuses 120. The heater apparatus 120 converts electric energy into thermal energy by receiving a supply of electric energy from the temperature controller 40, and raises the temperature of the battery 110 or heats the battery 10. The reason that the temperature of the battery 110 is raised is as follows.

An output upper limit value and an output lower limit value of the battery 110 change according to the temperature of the battery 110. For instance, when the temperature of the battery 110 is low, the output range of the battery 110 is narrowed. When the output range of the battery 110 is narrowed, the running speed and torque of the vehicle 1 are lowered. In addition, when the temperature of the battery 110 is low, the efficiency of the battery 110 is lowered, and the traveling distance of the vehicle 1 is shortened.

Because of this, in this embodiment, the heater apparatus 120 is attached to the battery 110. The temperature controller 40 acquires a temperature of the battery 110 from the battery temperature sensor 130 and drives the heater apparatus 120 when the temperature of the battery 110 is 0° C. or lower. Driving the heater apparatus 120 raises the temperature of the battery 110, whereby the output range of the battery 110 can be expanded.

In this manner, the heater apparatus 120 is used to expand the output range of the battery 110 when the temperature of the battery 110 is low. However, there may be a case such that the heater apparatus 120 malfunctions, which turns out the temperature of the battery 110 be not raised when the battery 110 is at a low temperature, or which contrarily turns out the temperature of the battery 110 being raised when the battery 110 is at a high temperature.

In the case where the temperature of the battery 110 cannot be raised when the temperature of the battery 110 is low, the output range of the battery 110 is narrowed as described above. Further, in the contrary case where the temperature of the battery 110 is raised when the temperature of the battery 110 is high, the performance of the battery 110 may be lowered or the battery 110 may ignite. Then, the heater apparatus 120 of the embodiment includes a heater temperature sensor configured to detect a temperature of a heater wire, as will be described later.

Figure 3:
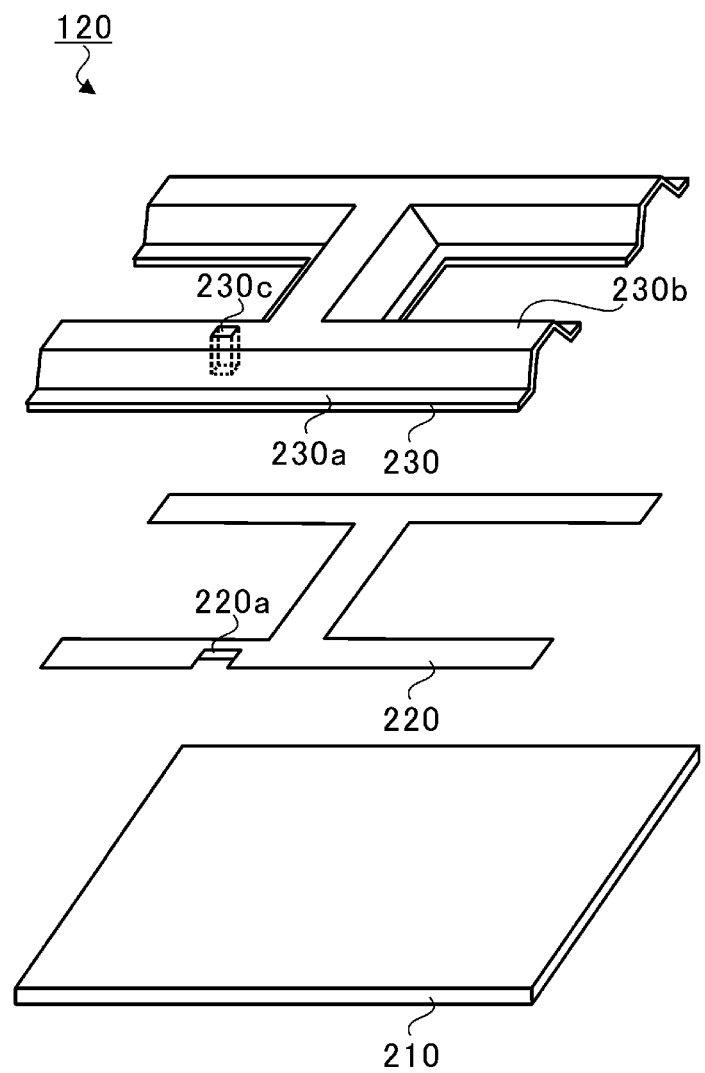
FIG. 3 is a schematic perspective view explaining a configuration of a heater apparatus.

FIG. 3 is a schematic perspective view explaining the configuration of the heater apparatus 120. The heater apparatus 120 includes a base member 210, a nonwoven fabric 220, and a cover member 230. The base member 210 supports the nonwoven 220 and the cover member 230. The base member 210 has a substantially flat plate shape.

The base member 210 is formed from a thermoplastic resin. For instance, the base member 210 is formed from polycarbonate which is suitable for mass production and has heat resistance. The base member 210 supports the nonwoven fabric 220 and the cover member 230 through clip fastening. The base member 210 is fixed to a lower portion (a bottom portion) of the battery 110 through fastening using a screw or a bolt. However, the disclosure is not limited thereto, and for example, the base member 210 may support the nonwoven fabric 220 and the cover member 230 through fastening using a screw or a bolt, or supports them with an adhesive.

The base member 210 is fixed to the lower portion of the battery 110 while supporting the nonwoven fabric 220 and the cover member 230. The nonwoven fabric 220 and the cover member 230 are disposed between the lower portion of the battery 110 and the base member 210 when the base member 210 is fixed to the lower portion of the battery 110. At this time, the cover member 230 contacts the lower portion of the battery 110. However, the disclosure is not limited to this configuration, and hence, the cover member 230 may be spaced apart from the lower portion of the battery 110.

The nonwoven fabric 220 is provided between the base member 210 and the cover member 230, and is supported by the base member 210. The nonwoven fabric 220 has substantially an H shape in a plan view. The nonwoven fabric 220 holds the heater wire (not shown in FIG. 3) in such a manner as to maintain the arrangement of the heater wire. The nonwoven fabric 220 has a folding portion 220a where a portion of the nonwoven fabric 220 that includes the heater wire is folded. Details of the folding portion 220a will be described later.

The cover member 230 is attached to the base member 210 and covers the whole of the nonwoven fabric 220. The cover member 230 has a substantially H-shaped flat plate portion 230a and a substantially H-shaped protruding portion 230b. The cover member 230 is formed form a thermoplastic resin. For instance, the cover member 230 is formed from polycarbonate suitable for mass production and having heat resistance. When the cover member 230 is attached to the base member 210, the flat plate portion 230a comes into contact with a region of the nonwoven fabric 220 where no heater wire is provided.

The protruding portion 230b protrudes from the flat plate portion 230a in a direction in which the protruding portion moves away from the base member 210 and the nonwoven fabric 220. When the cover member 230 is attached to the base member 210, the protrusion 230b maintains in a non-contact state where the cover member 230 stays apart from the nonwoven fabric 220 and the heater wire.

Here, in the event that the cover member 230 is made up of only the flat plate portion 230a, when the cover member 230 is attached to the base member 210, the cover member 230 comes into contact with the heater wire of the nonwoven fabric 220 supported by the base member 210. As described above, when the cover member 230 comes into contact with the heater wire, the heater wire may be disrupted by a force that would be applied when the cover member 230 is attached to the base member 210. When the cover member 230 comes into contact with the heater wire, in such a state that no predetermined space is provided between the cover member 230 and the heater wire, the heater wire may be heated abnormally or the cover member 230 may be deformed thermally.

Because of this, in this embodiment, the protruding portion 230b is provided on the cover member 230 where the cover member 230 is allowed to stay apart from the heater wire held by the nonwoven fabric 220. Providing the protruding portion 230b on the cover member 230 can suppress the breakage of the heater wire, the abnormal heating of the heater wire and the thermal deformation of the cover member 230.

In addition, the cover member 230 has a cover recessed portion 230c that is formed by recessing part of the protruding portion 230b in a direction in which the cover recessed portion 230c approaches the nonwoven fabric 220 (that is, the base member 210). The cover recessed portion 230c has a substantially quadrangular prism shape. However, the shape of the cover recessed portion 230c is not limited this shape and hence, the shape of the cover recessed portion 230c may have, for example, a polygonal prism shape, a cylindrical shape, or a shape of frustum of-circular cone. Details of the cover recessed portion 230c will be described later.

FIGS. 4A-4C show schematic plan views explaining the configuration of the nonwoven fabric 220. FIG. 4A is a diagram illustrating a state before the folding portion 220a is formed on the nonwoven fabric 220. In FIG. 4A, a folding region R 1 and a non-folding region R 2 of the nonwoven fabric 220 are illustrated as being indicated by broken lines. FIG. 4B is a plan view illustrating a state after a heater temperature sensor 220b is attached to the nonwoven fabric 220, and the folding portion 220a is formed. FIG. 4C is an enlarged view of a portion indicated by an alternative long and short dash line in FIG. 4B.

The nonwoven fabric 220 holds the heater wire 220c on a surface thereof that faces the cover member 230 (that is, a surface opposite to the cover member 230). For instance, the heater wire 220c is sewn down to the nonwoven fabric 220 with a thread (not shown) and maintains a heater wire layout configuration illustrated in FIG. 4A. However, the disclosure is not limited to this holding configuration, and hence, the heater wire 220c may be held on the nonwoven fabric 220 with an adhesive.

The temperature controller 40 is connected with the heater wire 220c and supplies electric energy to the heater wire 220c. The heater wire 220c generates Joule heat when electric energy is supplied the heater wire 220c from the temperature controller 40.

As illustrated in FIG. 4A, the heater wire 220c is formed on a whole surface of the nonwoven fabric 220 (that is, substantially into an H shape). The heater wire 220c is provided in such a manner that the heat wire 220c becomes denser at both end portions of the nonwoven fabric 220 in a longitudinal direction of the nonwoven fabric 220 (in a left-and-right direction in FIG. 4A) than a central portion of the nonwoven fabric 220. This is because the longitudinal end portions of the nonwoven fabric 220 are more easily brought into contact with outside air and hence are more easily cooled than the longitudinal center thereof. Because of this, in the heater wire 220c of this embodiment, the end portions are made denser than the central portion of the nonwoven fabric 220, so that the end portions are heated more intensely than the central portion.

The nonwoven fabric 220 includes the folding portion 220a provided at part of the central portion thereof. The folding portion 220a has the folding region R 1 on the surface of the nonwoven fabric 220 that faces the cover member 230. The nonwoven fabric 220 has the non-folding region R2 formed on the surface of the nonwoven fabric 220 that faces the cover member 230, and this non-folding region R2 lies adjacent to the folding region R 1, and the folding region R1 of the folding portion 220a is folded onto the non-folding region R2. Note that cuts are made at both end portions of the folding region R1 in the longitudinal direction of the nonwoven fabric 220 (in the left-and-right direction in FIG. 4A) to define the folding portion 220a.

The heater line 220c is provided in such a manner that part thereof passes through the folding region R 1 and the non-folding region R 2 of the nonwoven fabric 220. Specifically, the heater line 220c is provided so as to meander through a contact area in the folding region R1 where the heater wire 220 contacts the heater temperature sensor 220b, which will be described later. In addition, the heater wire 220c is provided so as to meander through a contact area in the non-folding region R2 where the heater wire 220c contacts the heater temperature sensor 220b.

As illustrated in FIG. 4B, t heater temperature sensor 220b is disposed in the non-folding region R 2 of the nonwoven fabric 220. The heater temperature sensor 220b is disposed on the heater wire 220c in the non-folding region R 2. The heater temperature sensor 220b detects a temperature of the heater wire 220c.

In the nonwoven fabric 220, with the temperature sensor 220b disposed on the heater wire 220c in the non-folding region R2, the folding region R1 (that is, the folding portion 220a) is folded in a direction in which the folding region R1 moves towards the non-folding region R2. As a result, the folding portion 220a is switched from the state illustrated in FIG. 4A to the state illustrated in FIG. 4B.

In the state illustrated in FIG. 4B, the heater temperature sensor 220b is covered with the nonwoven fabric 220 on a side facing the cover member 230 and a side facing the base portion 210. Specifically, the heater temperature sensor 220b is covered with the nonwoven fabric 220 (the folding portion 220a) of the folding region R1, being on the side facing the cover member 230, while covered with the nonwoven fabric 220 of the non-folding region R2, being on the side facing the base member 210. In this manner, the heater temperature sensor 220b is wrapped in by the nonwoven fabric 220 as a result of the folding portion 220a being folded.

When the folding portion 220a is folded, part of the folding region R1 comes opposite to part of the non-folding region R2. At this time, as illustrated in FIG. 4C, the heater temperature sensor 220b (a cross hatched portion in the figure) is brought into contact with the heater wire 220c (indicated by a broken line in the figure) provided in the folding region R 1. The heater temperature sensor 220b contacts the heater wire 220c (not shown in the figure) provided in the non-folding region R 2.

In this manner, the heater temperature sensor 220b comes into contact with a plurality of surfaces (at least an upper surface and a lower surface) of the nonwoven fabric 220 (the heater wire 220c) as a result of the holding portion 220a being folded. This can increase a contact area of the heater temperature sensor 220b with the heater wire 220c. Heat can easily be transmitted to the heater temperature sensor 220c by increasing the contact area of the temperature sensor 220b with the heater wire 220c. In this manner, the heater temperature sensor 220b can detect a temperature of the heater wire 220c with good accuracy.

As described above, in the event that the heater apparatus 120 malfunctions, the performance of the battery 110 may be reduced or the battery 110 may ignite. Due to this, the temperature controller 40 diagnoses whether the heater apparatus 120 functions properly. The temperature controller 40 acquires a temperature of the heater wire 220c from the heater temperature sensor 220b in order to diagnose whether the heater apparatus 120 functions properly.

The temperature controller 40 compares the temperature of the heater wire 220c with a first malfunction threshold (for example, 2° C.) while supplying electric energy to the heater wire 220c (hereinafter referred to as "heater ON").

With the heater ON, in the case where the temperature of the heater wire 220c is less than the first malfunction threshold, the temperature controller 40 determines that the heater apparatus 120 malfunctions. Further, with the heater On, in the case where the temperature of the heater wire 220c is the first malfunction threshold or more, the temperature controller 40 determines that the heater apparatus 120 performs properly.

On the other hand, the temperature controller 40 compares the temperature of the heater wire 220c with a second malfunction threshold (for example, 70° C.) while electric energy is not supplied to the heater wire 220c (hereinafter referred to as "heater OFF").

With the heater OFF, in the case where the temperature of the heater wire 220c is less than the second malfunction threshold, the temperature controller 40 determines that the heater apparatus 120 performs properly. With the heater OFF, in the case where the temperature of the heater wire 220c is the second malfunction threshold, the temperature controller 40 determines that the heater apparatus 120 malfunctions.

Here, conventionally, in the folding portion 220a illustrated in FIG. 4C, the folding region R1 and the non-folding region R2 are affixed together with a double-stick tape. Therefore, the double-stick tape may be peeled off due to aged deterioration, whereby the folding region R1 and the non-folding region R2 are separated from each other. In the event that the folding region R 1 and the non-folding region R 2 separate from each other, the heater temperature sensor 220b and the heater wire 220c in the folding region R1 separate from each other, whereby it may be difficult for the heater temperature sensor 220b to detect accurately the temperature of the heater wire 220c.

Figure 5:
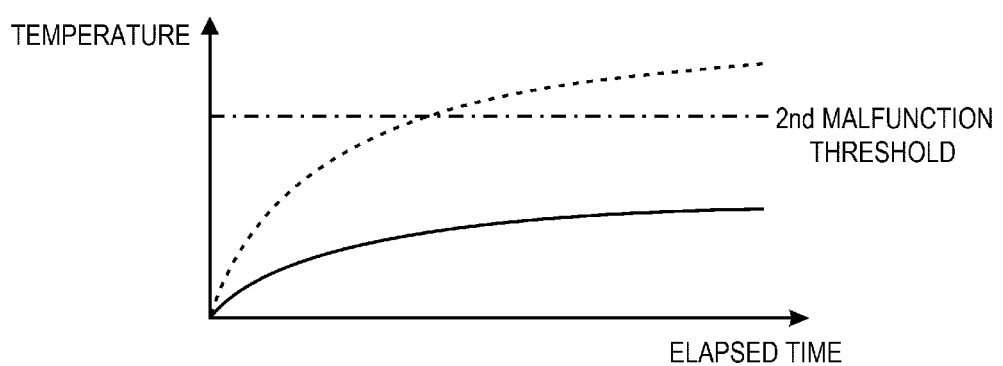
FIG. 5 is a diagram showing a relationship between a temperature of a heater wire and an elapsed time after heating by the heater apparatus is turned off as a result of a malfunction of the heater apparatus.

FIG. 5 is a diagram illustrating the relationship between the temperature of the heater wire 220c and the elapsed time after the heater is turned off at the time of malfunction of the heater apparatus 120. In FIG. 5, an axis of ordinate represents the temperature of the heater wire 220c detected by the heater temperature sensor 220b, and an axis of abscissa t represents the elapsed time after the heater is turned off.

In FIG. 5, a broken line represents the temperature of the heater wire 220c detected by the heater temperature sensor 220b before the double-stick tape peels off due to aged deterioration (that is, in a state where the heater temperature sensor 220b and the heater wire 220c are in contact with each other). A solid line represents the temperature of the heater wire 220c detected by the heater temperature sensor 220b after the double-stick tape peels off due to aged deterioration (that is, in a state where the heater temperature sensor 220b and the heater wire 220c separate from each other).

As indicated by the broken line in FIG. 5, the temperature of the heater wire 220c rises to the second malfunction threshold or higher after a predetermined time elapses since the heater is turned off, whereby the temperature controller 40 can determine that the heater apparatus 120 malfunctions. On the other hand, as indicated by the solid line, the temperature of the heater wire 220c never rises to the second malfunction threshold or higher after the heater is turned off, whereby the temperature controller 40 can never determine that the heater apparatus 120 malfunctions.

Then, in the cover member 230 of this embodiment, the cover recessed portion 230c is provided to suppress the separation of the heater temperature sensor 220b from the heater wire 220c due to aged deterioration. Hereinafter, a positional relationship between the cover recessed portion 230c and the folding portion 220a of this embodiment will be described.

Figure 6A:
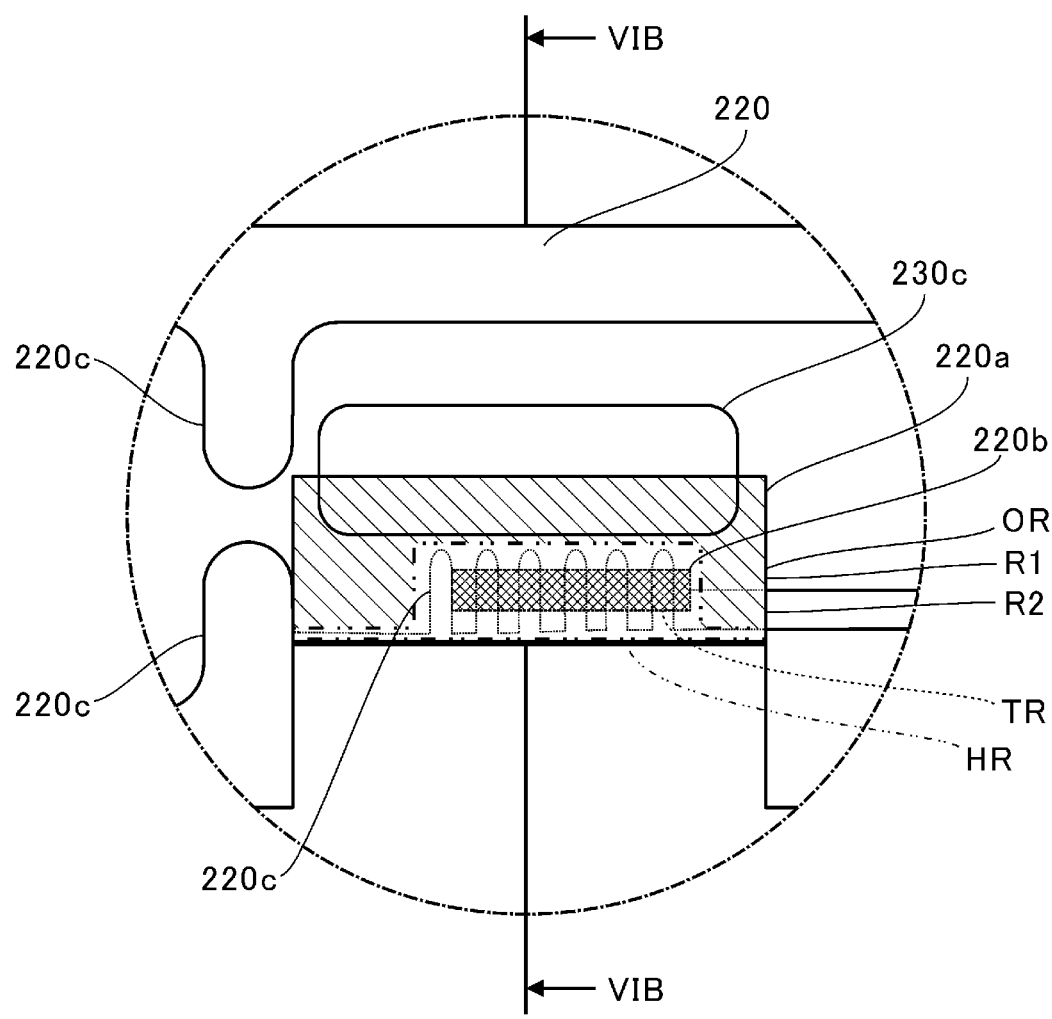
FIGS. 6A-6B are diagrams explaining a positional relationship between a recess portion and a folding portion.
Figure 6B:
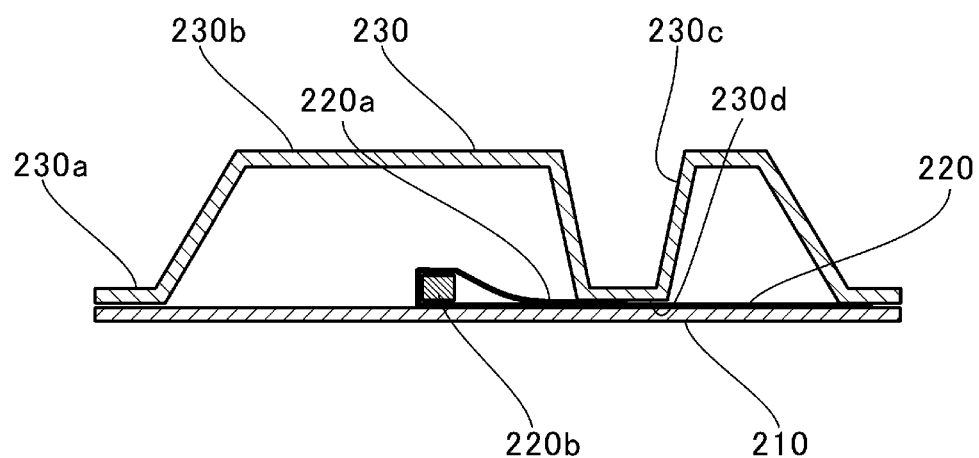

FIGS. 6A-6B illustrate diagrams explaining the positional relationship between the cover recessed portion 230c and the folding portion 220a. FIG. 6A is a plan view of the cover member 230 and the nonwoven fabric 220 as viewed from above the cover member 230, illustrating a portion indicated by an alternate long and short dash line in FIG. 4B in an enlarged fashion. FIG. 6B is a cross-sectional view taken along a line VIB-VIB in FIG. 6A. In FIG. 6B, an upper side denotes an upward direction of the heater apparatus 120 (the cover member 230, the nonwoven fabric 220, and the base member 210), while a lower side denotes a downward direction of the heater apparatus 120 (the cover member 230, the nonwoven fabric 220, and the base member 210).

With the nonwoven fabric 220 and the cover member 230 attached to the base member 210, as shown in FIG. 6A, the cover recessed portion 230c is positioned above a region of the nonwoven fabric 220 where the heater wire 220c is not formed (that is, a region formed only of the nonwoven fabric 220).

The cover recessed portion 230c is disposed in a position where at least part thereof overlaps the folding portion 220a in an up-and-down direction. That is, at least part of the cover recessed portion 230c is positioned above an overlapping region OR where the folding region R 1 and the non-folding region R 2 of the nonwoven fabric 220 overlap each other.

Here, the overlapping region OR includes a temperature sensor disposition region TR (a cross hatched portion in the figure) where the heater temperature sensor 220b is disposed. At least part of the cover recessed portion 230c is positioned above a region other than the temperature sensor disposition region TR of the superposition region OR (a non-temperature-sensor-disposition region).

Such a configuration is to prevent the cover recessed portion 230c from contacting the heater temperature sensor 220b to thereby damage the heater temperature sensor 220b in attaching the cover member 230 to the base member 210.

The overlapping region OR includes a heater wire disposition region HR (a region surrounded by a chain double-dashed line in the figure) where the heater wire 220c is disposed. At least part of the cover recessed portion 230c is positioned above a region other than the heater wire disposition region HR in the overlapping region OR (a non-heater-wire-disposition region).

When referred to herein, the non-heater-wire-disposition region means a region where the heater wire 220c is less dense compared with the heater wire disposition region HR. In this embodiment, the non-heater-wire-disposition region constitutes a region where the heater wire 220c is not disposed.

In the event that at least part of the cover recessed portion 230c is positioned above the heater wire disposition region HR, the cover recessed portion 230c may be brought into contact with the nonwoven fabric 220 (the heater wire 220c). In the case where the cover recessed portion 230c is brought into contact with the nonwoven fabric 220 (the heater wire 220c), the heater wire 220c may be broken, the heater wire 220c may be heated abnormally, or the cover member 230 may be thermally deformed, as described above. Due to this, at least part of the cover recessed portion 230c is placed above the region (the non-heater-wire-disposition region) other than the heater wire disposition region HR.

In this manner, at least part of the cover recessed portion 230c is positioned above the non-temperature-sensor-disposition region and the non-heater-wire-disposition region (the hatched portion in the figure) in the overlapping region. In other words, at least part of the cover recessed portion 230c is positioned above a region (a hatched region in the figure) where only the nonwoven fabric 220 overlaps in the overlap region OR.

In addition, as shown in FIG. 6B, a bottom surface 230d of the cover recessed portion 230c contacts the folding portion 220a. With the nonwoven fabric 220 and the cover member 230 attached to the base member 210, a space defined between the bottom surface 230d and the base member 210 is twice the thickness of the nonwoven fabric 220 or less.

Setting the space between the bottom surface 230d and the base member 210 to the space equal to or less than twice the thickness of the nonwoven fabric 220 allow the cover recessed portion 230c and the base member 210 to hold the nonwoven fabric 220 including the folding portion 220a therebetween in a pressed state.

Sandwiching the nonwoven fabric 220 including the folding portion 220a can maintain the contact state of the heater wire 220c provided in the folding region R 1 and the non-folding region R 2 with the heater temperature sensor 220b.

Thus, as has been described heretofore, the heater apparatus 120 of this embodiment includes the cover recessed portion 230c provided in the cover member 230. Providing the cover recessed portion 230c in the cover member 230 allows the nonwoven fabric 220 including the folding portion 220a to be held by the cover recessed portion 230c and the base member 210 therebetween.

Sandwiching the nonwoven fabric 220 including the folded portion 220a can suppress the separation of the heater temperature sensor 220b from the heater wire 220c that would otherwise be caused by aged deterioration. As a result, the accuracy with which the heater temperature sensor 220b detects a temperature of the heat wire 220c can be maintained.

Modified Embodiment

Figure 7:
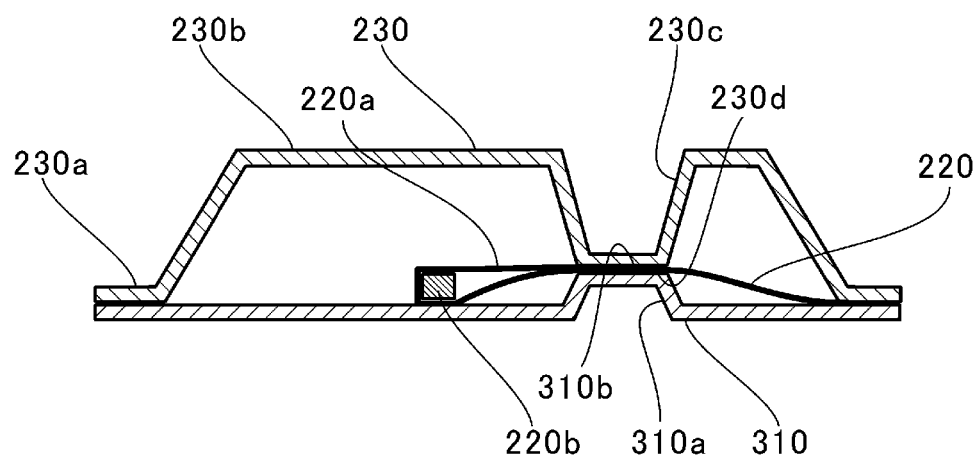
FIG. 7 is a cross-sectional view of a modified embodiment taken along a line VIB-VIB in FIG. 6A.

FIG. 7 is a cross-sectional view of a modified embodiment taken along a line VIB-VIB in FIG. 6A. This modified embodiment differs in configuration of a base member from that of the base member 210 of the embodiment described above. In this modified embodiment, like reference signs will be given to elements having substantially like functions or configurations to those of the embodiment described above so as to omit the repetition of similar descriptions. In this modified embodiment, a base member 310 is provided in place of the base member 210 of the embodiment described above.

The base member 310 has a substantially flat plate shape. The base member 310 has a base recessed portion 310a where the base member 30 is recessed in a direction in which the base member 310 approaches a nonwoven fabric 220 (that is, towards a cover member 230). The base recessed portion 310a has a substantially quadrangular prism shape. However, the shape of the base recessed portion 310a is not limited to this shape, and hence, the shape of the base recessed portion 310a may have, for example, a polygonal prism shape, a cylindrical shape, or a shape of frustum of circular cone.

The base recessed portion 310a of the base member 310 is formed in a position located opposite to a cover recessed portion 230c of the cover member 230. Therefore, as described in relation to the above embodiment, the base recessed portion 310a is positioned above a region of the nonwoven fabric 220 where a heater wire 220c is not formed (that is, a region formed only of the nonwoven fabric 220).

At least part of the base recessed portion 310a is positioned below or underneath a folding portion 220a. That is, at least part of the base recessed portion 310a is positioned below or underneath an overlapping region OR where a folding region R1 and a non-folding region R2 of the nonwoven fabric 220 overlap. At least part of the base recessed portion 310a is positioned below or underneath a non-temperature-sensor-deposition region and a non-heater-wire-deposition region of the overlapping region OR.

As shown in FIG. 7, a bottom surface 230d of the cover recessed portion 230c contacts the folding portion 220a, and a bottom surface 310b of the base recessed portion 310a contacts the nonwoven fabric 220 that lies opposite to the folding portion 220a. With the nonwoven fabric 220 and the cover member 230 attached to the base member 310, a space defined between the bottom surface 230d and the bottom surface 310b is equal to or less than twice the thickness of the nonwoven fabric 220.

Setting the space between the bottom surface 230d and the bottom surface 310b to the space equal to or less than twice the thickness of the nonwoven fabric 220 allow the cover recessed portion 230c and the base recessed portion 310a to hold the nonwoven fabric 220 including the folding portion 220a therebetween in a pressed state.

Sandwiching the nonwoven fabric 220 including the folding portion 220a can maintain the contact state of the heater wire 220c provided in the folding region R 1 and the non-folding region R 2 with the heater temperature sensor 220b.

Thus, as has been described above, in the heater apparatus 120 of the modified embodiment, the cover recessed portion 230c is provided in the cover member 230, and the base recessed portion 310a is provided in the base member 310. Providing the cover recessed portion 230c in the cover member 230 and the base recessed portion 310a in the base member 310 allows the nonwoven fabric 220 including the folding portion 220a to be held by the cover recessed portion 230c and the base recessed portion 310a.

Sandwiching the nonwoven fabric 220 including the folded portion 220a can suppress the separation of the heater temperature sensor 220b from the heater wire 220c that would otherwise be caused by aged deterioration. As a result, the accuracy with which the heater temperature sensor 220b detects a temperature of the heat wire 220c can be maintained.

Thus, the embodiment and modified embodiment have been described by reference to the accompanying drawings; however, needless to say, the disclosure is not limited to the embodiment and modified embodiment, and various modified embodiments or altered embodiments that fall within the scope of claims also belong to the technical scope of the disclosure.

For instance, although the disclosure is described as being applied to the electric vehicle (EV) as a matter of convenience of description in the embodiment and the modified embodiment, the disclosure can also be applied to various types of vehicles including a hybrid electric vehicle (HV), provided that the battery 110 is used therein.

In addition, in the embodiment and the modified embodiment that have been described above, the nonwoven fabric 220 is described as holding the heater wire. However, the disclosure is not limited to this configuration, and hence, the heater wire may be held by a cloth member such as a woven fabric or a knitted one, for example.

Additionally, in the embodiment and the modification that have been described above, the folding portion 220a is described as being formed in the nonwoven fabric 220. However, the disclosure is not limited to this configuration, and hence, the folding portion 220a may not be formed on the nonwoven fabric 220. For instance, in the heater temperature sensor 220b, the side facing the cover member 230 and the side facing the base member 210 may be covered with the two pieces of nonwoven fabric 220 which hold the heater wire 220c thereon.

Further, in the embodiment and the modified embodiment that have been described above, at least part of the cover recessed portion 230c (the base recessed portion 310a) is described as being disposed above (below) the region (the non-temperature-sensor-disposition region) of the overlapping region OR other than the temperature sensor disposition region TR. However, the disclosure is not limited to this configuration, and hence, at least part of the cover recessed portion 230c (the base recessed portion 310a) may be disposed above (below) the temperature sensor disposition region TR.

For instance, at least part of the cover recessed portion 230c (the base recessed portion 310a) is disposed apart from the nonwoven fabric 220 above (below) the temperature sensor disposition region TR. That is, at least part of the cover recessed portion 230c (the base recessed portion 310a) is disposed in such a manner as to define a predetermined space between the nonwoven fabric 220 and itself.

As a result, in attaching the cover member 230 to the base member 210, it is possible to reduce the possibility that the heater wire 220c is broken, the heater wire 220c is heated abnormally, or the cover member 230 is thermally deformed. Further, by providing the cover recessed portion 230c (the base recessed portion 310a) above (below) the temperature sensor disposition region TR, when the non-woven fabric 220 moves in a direction in which the nonwoven fabric 220 travels away from the heater temperature sensor 220b, the traveling amount of the nonwoven fabric 220 can be suppressed.

According to the disclosure, it is possible to maintain the accuracy with which the temperature of the heater wire is detected.

The invention claimed is:

1. A heater apparatus comprising:
a base member;
a cover member supported by the base member;
a cloth member provided between the base member and the cover member, the cloth member including a folding portion;
a heater wire attached to the cloth member in the folding portion; and
a heater temperature sensor brought into contact with the cloth member, covered on a base member side facing the base member and a cover member side facing the cover member with the cloth member, and configured to detect a temperature of the heater wire, wherein
the cover member has a cover recessed portion recessed towards the base member in an overlapping region where the cloth member on the base member side and the cloth member on the cover member side of the heater temperature sensor overlap.

2. The heater apparatus according to claim 1, wherein the base member has a base recessed portion recessed toward the cover member in the overlapping region.

3. The heater apparatus according to claim 1, wherein the cover recessed portion is provided in a non-temperature-sensor-disposition region where the heater temperature sensor is not disposed in the overlapping region.

4. The heater apparatus according to claim 2, wherein the cover recessed portion is provided in a non-temperature-sensor-disposition region where the heater temperature sensor is not disposed in the overlapping region.

5. The heater apparatus according to claim 1, wherein the cover recessed portion is provided in a non-heater-wire-disposition region where the heater wire is not disposed in the overlapping region.

6. The heater apparatus according to claim 1, wherein the heater wire is attached to the cloth member via an adhesive.

7. The heater apparatus according to claim 1, wherein the heater wire is sewn to the cloth member.

8. The heater apparatus according to claim 1, wherein the cover member covers an entirety of the cloth member.

9. The heater apparatus according to claim 1, wherein the cover member is separated from the heater wire via the cover recessed portion.

10. The heater apparatus according to claim 1, wherein the cloth member holds the heater wire on a surface thereof that faces the cover member.

11. The heater apparatus according to claim 1, wherein the cloth member holds the heater wire on a surface thereof that is opposite to a top surface of the base member.

12. The heater apparatus according to claim 1, wherein the folding portion that has:
a folding region on a surface of cloth member that faces the cover member; and
a non-folding region formed on the surface of the cloth member that faces the cover member,
wherein the non-folding region lies adjacent to the folding region, and
wherein the folding region of the folding portion is folded onto the non-folding region.

13. A heater apparatus comprising:
a heater wire;
a first cloth member including a first surface and configured to support the heater wire on the first surface;
a second cloth member including a second surface and located at a position where the second surface is facing the first surface, the second cloth member overlaps a first part of the heater wire when viewed from a first direction orthogonal to the first surface;
a temperature sensor located between the first surface of the first cloth member and the second surface of the second cloth member, the temperature sensor overlaps at least a part of the first part of the heater wire when viewed from the first direction; and
a holding member configured to hold the first cloth member and second cloth member so that the first surface and the second surface are close together in a first region, the first region is located in a second region where the first cloth member and the second cloth member overlap when viewed from the first direction, the first region does not overlap a third region where the heater wire and the temperature sensor are located when viewed from the first direction.

14. The heater apparatus according to claim 13, further comprising:

a base member positioned facing a third surface of the first cloth member, the third surface is opposite to the first surface; and a cover member positioned facing a fourth surface of the second cloth member, the fourth surface is opposite to the second surface, wherein the base member includes a first portion overlapping the first region when viewed from the first direction, the first portion contacts the third surface of the first cloth member, wherein the cover member includes a second portion overlapping the first region when viewed from the first direction and a third portion overlapping the third region when viewed from the first direction, the second portion contacts the fourth surface of the second cloth member, the third portion separates from the first cloth member and the second cloth member along the first direction, and wherein the holding portion includes the first portion of the base member and the second portion of the cover member.

15. The heater apparatus according to claim 13, wherein the first cloth member and the second cloth member are connected at a connecting portion and form a third cloth member, wherein the first surface of the first cloth member and the second surface of the second cloth member form a fifth surface of the third cloth member, wherein the third cloth member is folded with the fifth surface inward at the connecting portion, and wherein the temperature sensor is located between the connecting portion and the first region when viewed from the first direction.

16. The heater apparatus according to claim 14, wherein the first cloth member and the second cloth member are connected at a connecting portion and form a third cloth member, wherein the first surface of the first cloth member and the second surface of the second cloth member form a fifth surface of the third cloth member, wherein the third cloth member is folded with the fifth surface inward at the connecting portion, and wherein the temperature sensor is located between the connecting portion and the first region when viewed from the first direction.

17. The heater apparatus according to claim 15, wherein the heater wire includes an extending portion that extends from the first surface of the first cloth member onto the second surface of the second cloth member via the connecting portion, and wherein the temperature sensor overlaps at least a part of the extending portion of the heater wire when viewed from the first direction.

18. The heater apparatus according to claim 16, wherein the heater wire includes an extending portion that extends from the first surface of the first cloth member onto the second surface of the second cloth member via the connecting portion, and wherein the temperature sensor overlaps at least a part of the extending portion of the heater wire when viewed from the first direction.

* * * * *